United States Patent [19]

Tajima

[11] Patent Number: 4,904,548
[45] Date of Patent: Feb. 27, 1990

[54] METHOD FOR CONTROLLING A FUEL CELL

[75] Inventor: Hiroyuki Tajima, Kawasaki, Japan

[73] Assignee: Fuji Electric Co., Ltd., Kanagawa, Japan

[21] Appl. No.: 227,608

[22] Filed: Aug. 2, 1988

[30] Foreign Application Priority Data

Aug. 3, 1987 [JP] Japan .............................. 62-192703
Aug. 3, 1987 [JP] Japan .............................. 62-192704

[51] Int. Cl.⁴ ............................................. H01M 8/04
[52] U.S. Cl. ........................................ 429/22; 429/23
[58] Field of Search ...................................... 429/22, 23

[56] References Cited

U.S. PATENT DOCUMENTS

| | | | |
|---|---|---|---|
| 3,585,077 | 6/1971 | Waldman ......................... | 429/23 X |
| 3,745,047 | 7/1973 | Franciullo et al. ................ | 429/23 |
| 4,046,956 | 9/1977 | Franciullo ....................... | 429/29 X |
| 4,677,037 | 6/1987 | Takabayashi ..................... | 429/23 X |

*Primary Examiner*—Stephen J. Kalafut
*Attorney, Agent, or Firm*—Spencer & Frank

[57] ABSTRACT

In order to control a fuel cell having a fuel cell stack to which reformed fuel and oxidizing agent are supplied, an output current from the fuel cell is detected while the voltage of the fuel cell is maintained at a constant voltage and the amount of the fuel and/or the oxidizing agent is controlled in accordance with the detected output current to stably generate electric power. At least one of a plurality of unit cells constituting the fuel cell stack is used as a monitoring cell having a current-voltage characteristic curve which is lower than that of the other unit cells, and an output current from the monitoring cell is detected while the voltage of this cell is maintained at a constant voltage, and the supplied amount of the fuel and/or the oxidizing agent is controlled in accordance with the detected current value to stably generate electric power output.

10 Claims, 5 Drawing Sheets

METHOD FOR CONTROLLING A FUEL CELL

BACKGROUND OF THE INVENTION

1. Field of the Invention

The present invention relates to a method for the operation of a power generation system utilizing a fuel cell, and more particularly to a method for controlling the fuel cell.

2. Description of the Prior Art

In a conventional generator system utilizing a fuel cell, hydrogen obtained by reforming a hydrocarbon is used as fuel. For example, when methanol is reformed with steam, hydrogen is obtained by the following reaction:

$$CH_3OH + H_2O \rightarrow CO_2 + 3H_2$$

When the above hydrogen-containing carbon dioxide and air are supplied to a phosphoric acid type fuel cell to generate electric power, the following reactions occur in an anode and a cathode of the fuel cell, respectively:

Anode: $H_2 \rightarrow 2H^+ + 2e$

Cathode: $\frac{1}{2}O_2 + 2e + 2H^+ \rightarrow H_2O$

That is, the oxidation reaction of hydrogen proceeds in the anode, while the reduction reaction of oxygen in air as an oxidizing agent proceeds in the cathode, and water is obtained by an electrochemical reaction between hydrogen and oxygen as an entire reaction. In the course of this reaction, chemical energy is converted into electrical energy, which is taken out as an electric output to the exterior.

The current obtained by the above-mentioned reaction is proportional to the amounts of hydrogen and oxygen consumed according to Faraday's law.

When methanol is a starting material for obtaining a hydrogen fuel, methanol and water are supplied to a reformer. In this case, the molar ratio of water to methanol supplied is about 1.3–2. Since water is supplied in an amount larger than the stoichiometrically calculated reaction amount as mentioned above, the reformed gas obtained by the reforming reaction contains water.

The reforming reaction of methanol is generally carried out at a temperature of about 250° C. As a catalyst for the reforming reaction, a ZnO or CuO series catalyst is used and is filled in a reforming tube, through which a mixed vapor of methanol and water is passed to conduct the reforming reaction. Since the reforming reaction is endothermic, it is performed by heating the catalyst and the mixed vapor of methanol and water. The heat for this heating is obtained by supplying a fuel to a burner for the reformer and by burning it in air supplied from a fan for the reformer. In this case, the fuel can be supplied, for example, by the following three methods. The first method is a method of supplying methanol from a methanol tank through a methanol pump. The second method is a method of using an off-gas discharged from a fuel cell stack. The third method is a method of using the above methanol and off-gas together.

The mixed liquid of methanol and water supplied to the reformer evaporates in the reforming tube in the reformer. In the reforming tube, a reformed gas including hydrogen and carbon dioxide is produced by the action of the catalyst. This reformed gas is fed to a fuel gas chamber arranged on the side of a fuel electrode (anode) in the fuel cell stack. An excessive amount of off-gas including hydrogen, carbon dioxide and steam, which do not contribute to the electromotive reaction, is discharged from the fuel gas chamber and supplied to the burner for the reformer. As mentioned above, the combustion heat of the burner is the heat for accelerating the endothermic reaction.

The fuel cell stack is composed of a unit cell having a pair of electrodes; a fuel electrode (anode) and an air electrode (cathode). However, the output voltage of the unit cell having a pair of electrodes is about 1 V at most and the output current per unit area of the electrode is several hundreds $mA/cm^2$. Therefore, a large output with a high voltage and a high current is obtained by using a plurality of stacks, each connecting a plurality of unit cells of large area in series and optionally, combining series and, parallel connections of these stacks.

The stoichiometric amounts of hydrogen and oxygen in air consumed by these stacks are proportional to the number n of unit cells in the stack and the output current I.

In general, the power generator system of the fuel cell is operated by supplying hydrogen and oxygen in amounts which are excessively larger than those theoretically consumed in the stack. The ratio of the consumption amount of each of hydrogen and oxygen to the supply amount of each of hydrogen and oxygen is called the utilization ratio. In the power generator system of the fuel cell, the hydrogen utilization ratio is 70–80%, and the oxygen utilization ratio (air utilization ratio in the case of air supply and consumption) is 50–60%.

The control of the hydrogen and oxygen utilization ratios is carried out by setting the output current from the stack and by supplying water and methanol as a reforming material to the reformer in proportion to the set current.

In the case of this control, if a time delay for applying water and methanol to the reformer to obtain a reformed gas and the reformed gas is supplied to the stack and the reforming reaction temperature are not properly controlled, the reforming reaction does not proceed sufficiently. Therefore, the output of the generator system utilizing the fuel cell should be controlled by considering the above-mentioned time delay. If such a control is not performed, hydrogen gas in the stack becomes short at the time that, for example, the operation of the fuel cell is started or the output is increased and hence the power generator cannot be driven.

Such a shortage of hydrogen gas results in a shortage of hydrogen gas in the off-gas and consequently, it may happen that the burner in the reformer misfires, and as a result the reformer is disabled.

Furthermore, in the case of a lighter gas shortage, which is less serious than the shortage of the hydrogen gas, gas shortage in the stack does not result, but the off-gas is short. As a result, the temperature of the reformer is lowered and the amount of the reformed gas decreases, and finally the operation of the power generator system utilizing the fuel cell is interrupted.

Moreover, the amount of the reformed gas becomes excessive when the output is lowered or when the output is interrupted, and hence it may happen that the amount of the off-gas becomes excessive and results in an increase in the temperature of the reformer.

In order to overcome the above drawbacks, the amount of reformed fuel gas has hitherto been controlled by a feedforward system or a feedback system in accordance with the output current from the fuel cell.

In the feedforward system, methanol as the fuel for the burner in the reformer is first burnt prior to the increase of the output current.

Then, the amounts of water and methanol as the starting material for the reformation are increased to increase the output current after the given delay time. In the case of decreasing the output current, there is adopted a method of first reducing the output current and then decreasing the output from the reformer, which is opposite to the case of increasing the output current.

On the other hand, in the feedback system, there is adopted a method of supplying an excessive amount of the reformed gas to the stack with consideration of the delay when the reformed gas is supplied.

In the conventional method for controlling the operation of the power generator system utilizing the fuel cell, however, an excessive amount of a fuel burnt in the burner for the reformer is required, so that energy is undesirably consumed. Furthermore, since the excessive fuel is burnt, the reformer is overheated and deteriorates the catalyst for the reforming reaction and, consequently there is the possibility that the reforming reaction does not proceed in a normal condition. Particularly, such drawbacks are notable in the case of the feedback system.

SUMMARY OF THE INVENTION

It is, therefore, an object of the present invention to eliminate the above-mentioned drawbacks and to provide a method for controlling a fuel cell which can efficiently operate a power generator system utilizing the fuel cell.

According to the present invention, the fuel cell is operated while maintaining its voltage at a constant voltage. During the operation, an output current is detected and the fuel and/or oxidizing agent are supplied so as to make the detected current value equal to a predetermined current value, whereby a stable power output can efficiently be obtained.

Moreover, at least one of a plurality of unit cells constituting the fuel cell stack is used as a monitoring cell and the current voltage characteristic thereof is set to be lower than those of the other unit cells and the current is obtained while maintaining its voltage at a constant valve, so that the fuel and/or oxidizing agent can be supplied in accordance with the output current to obtain a stable power output more efficiently.

In the first aspect of the present invention, a method for controlling a fuel cell having a fuel cell stack to which a reformed fuel and an oxidizing agent are supplied is provided, the method including the steps of:

generating electric power while keeping the fuel cell stack at a voltage having a constant value;

detecting an output current from the fuel cell stack;

calculating a difference between a value of the output current detected and a predetermined current value; and varying the amount of the fuel and/or oxidizing agent to be supplied in accordance with the difference calculated.

Here, the value of the predetermined current of the fuel cell stack may be set stepwise.

The value of the predetermined current may be set in accordance with a power consumption by a load to be connected to the fuel cell.

The value of the predetermined current may be set in accordance with an amount of charge in a back-up battery to be connected in parallel to the fuel cell.

The fuel may be hydrogen and the oxidizing agent may be air.

In the second aspect of the present invention, a method for controlling a fuel cell having a fuel cell stack comprising a plurality of unit cells to which a reformed fuel and an oxidizing agent are supplied is provided, the method including the steps of:

using at least one of a plurality of unit cells constituting the fuel cell stack as a monitoring cell having a current-voltage characteristic lower than that of the remaining unit cells;

generating electric power while keeping the monitoring cell at a voltage having a constant value;

detecting an output current from the fuel cell stack;

calculating a difference between a value of the output current and a predetermined current value; and varying the amount of the fuel and/or oxidizing agent to be supplied in accordance with the difference calculated.

Here, the value of the predetermined current of the fuel cell stack may be set stepwise.

The value of the predetermined current may be set in accordance with a power consumption by a load to be connected to the fuel cell.

The valud of the predetermined current may be set in accordance with an amount of charge in a back-up battery to be connected in parallel to the fuel cell.

The fuel may be hydrogen and the oxidizing agent may be air.

The above and other objects, effects, features and advantages of the present invention will become more apparent from the following description of various embodiments thereof taken in conjunction with the accompanying drawings.

DETAILED DESCRIPTION OF THE PREFERRED EMBODIMENTS

Figure 1:
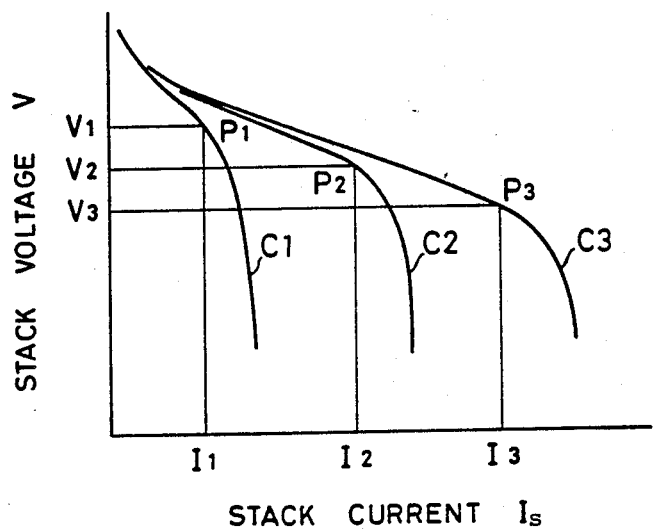
FIG. 1 is a graph illustrating the relationship between the output current and the output voltage of the fuel cell stack in the first embodiment of the present invention.

FIG. 1 shows the relationship between the output current I and the output voltage V of the fuel cell stack in the embodiment of the present invention. C1, C2 and C3 illustrate current-voltage curves (I-V curves), wherein an amount of fuel supplied to a fuel cell stack 10 (shown in FIG. 2) at a predetermined temperature is varied. In these I-V curves, the amount of fuel supplied becomes smaller in the sequence of C3, C2 and C1.

In FIG. 1, $V_1$ and $I_1$ represent the voltage and current at a point $P_1$, changing from a straight line to a curved line in the I-V curve C1, respectively. Similarly, $V_2$ and $I_2$ represent the voltage and a current at point $P_2$ in the I-V curve C2, respectively. $V_3$ and $I_3$ represent the voltage and current at a point $P_3$ in the I-V curve C3, respectively.

In the I-V curve C3, the amount of fuel supplied to the stack 10 is large, the straight line portion in which the voltage is lowered in proportion to the current is longer than that in the case of the other I-V curves. Such a voltage decrease mainly results from the internal resistance of the cell. When the current is outputted over this straight line region, the voltage is rapidly lowered as shown in FIG. 1. Such a phenomenon is caused due to the fact that the supply of reforming material to a reformer 1 (shown in FIG. 2) is delayed.

According to the present invention, therefore, the fuel cell is so controlled that the amount of fuel and/or oxidizing agent supplied is varied in accordance with the output current of the fuel cell.

Figure 2:
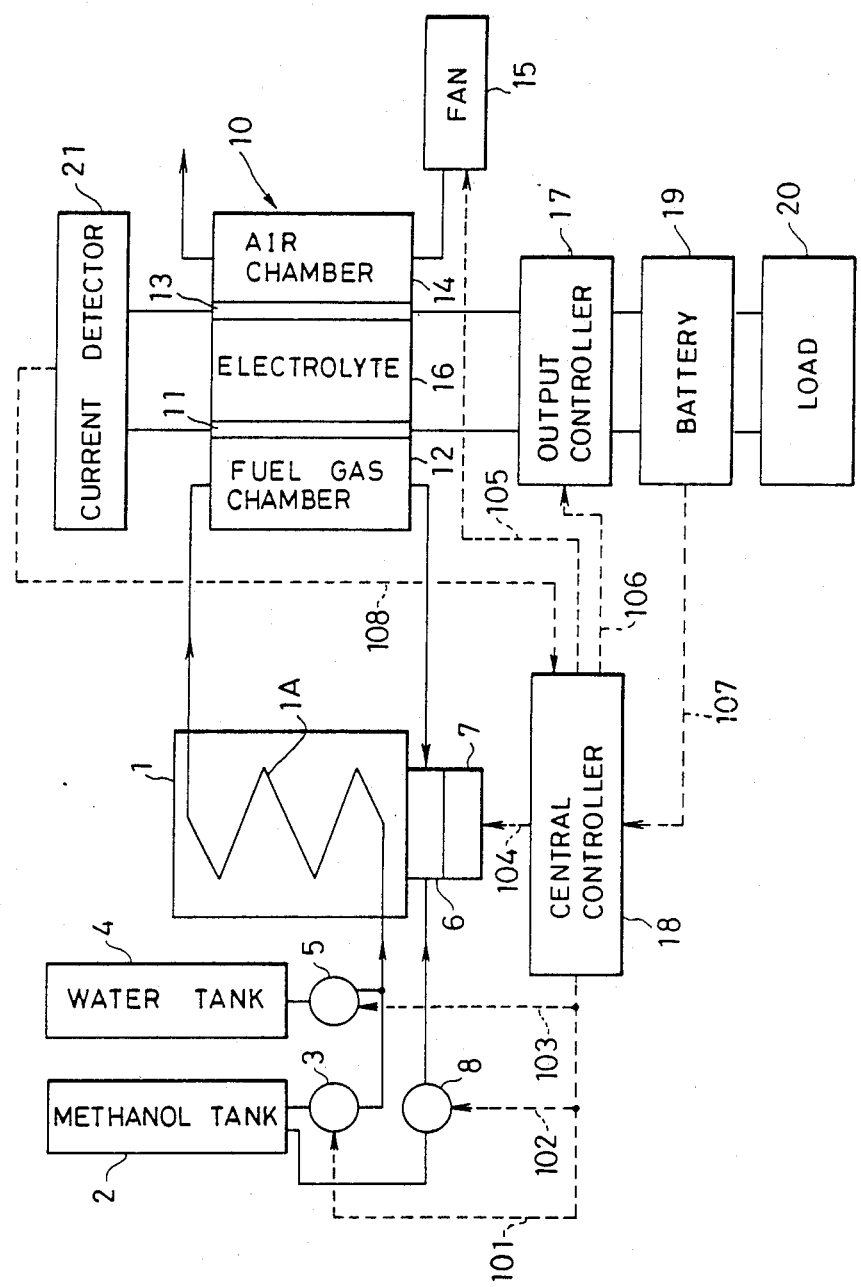
FIG. 2 is a block diagram showing an embodiment of a power generator system utilizing the fuel cell according to the present invention.

A first embodiment of the power generator system utilizing the fuel cell in which the control method according to the present invention is performed is shown in FIG. 2. Here, reference numeral 1 denotes a reformer for reforming methanol to produce hydrogen. Water and methanol are supplied to the reformer 1. That is, methanol is fed from a methanol tank 2 through a methanol pump 3 to the reformer 1, while water is fed from a water tank 4 through a water pump 5 to the reformer 1. The molar ratio of water to methanol supplied is about 1.3-2. Thus, water is supplied in an amount larger than the stoichiometrically calculated reaction amount, so that the reformed gas obtained by the reforming reaction contains water.

The reforming reaction of methanol is generally carried out at a temperature of about 250° C. As a catalyst for the reforming reaction, a ZnO or CuO series catalyst is used and is filled in a reforming tube 1A, through which a mixed vapor of methanol and water is passed to conduct the reforming reaction. Since the reforming reaction is endothermic, it is performed by heating the catalyst and the mixed vapor of methanol and water. The heat for this heating is obtained by supplying fuel to a burner 6 for the reformer 1 and by burning it in air supplied from a fan 7 for the reformer 1. In this case, the fuel can be supplied, for example, by the following three methods. The first method is the method of supplying methanol from the methanol tank 2 through a methanol pump 3. The second method is a method of using an off-gas discharged from a fuel cell stack 10 as mentioned later. The third method is a method of using the above methanol and off-gas together.

The mixed liquid of methanol and water supplied to the reformer 1 evaporates in the reforming tube 1A in the reformer 1. In the reforming tube 1A, a reforming gas including hydrogen and carbon dioxide is produced by the action of the catalyst. This reformed gas is fed to a fuel gas chamber 12 arranged on the side of a fuel electrode (anode) 11 in the fuel cell stack 10. An excessive amount of off-gas including hydrogen, carbon dioxide and steam, which do not contribute to the electromotive reaction, is discharged from the fuel gas chamber 12 and supplied to the burner 6 for the reformer 1.

As mentioned above, the combustion heat of the burner 6 is the heat for accelerating the endothermic reaction.

On the other hand, air is supplied to an air chamber 14 on the side of an air electrode (cathode) 13 in the fuel cell stack 10 from a fan 15, and an excessive amount of air not contributing to the reaction is discharged to the exterior of the stack 10.

Reference numeral 16 denotes an electrolyte filled in a space between the fuel electrode 11 and the air electrode 13.

The fuel cell stack 10 is composed of a unit cell having a pair of electrodes a fuel electrode (anode) 11 and an air electrode (cathode) 13. However, the output voltage from the unit cell having a pair of electrodes 11 and 13 is about 1 V at most and an output current per unit area of the electrode is several hundreds $mA/cm^2$. Therefore, a large output of a high voltage and a high current is obtained by using plural stacks, each having a plurality of unit cells of large area connected in series and by combining these stacks with each other in series and/or in parallel in a desired manner.

The stoichiometric amounts of hydrogen and oxygen in air consumed by these stacks are proportional to the number n of the unit cells in the stack and the output current I.

In general, the power generator system of the fuel cell is operated by supplying hydrogen and oxygen in amounts which are excessively larger than those theoretically consumed in the stack. The ratio of the consumption amount of each of hydrogen and oxygen to the supply amount of each of hydrogen and oxygen is called the utilization ratio. In the power generator system of the fuel cell, the hydrogen utilization ratio is 70-80%, and the oxygen utilization ratio (air utilization ratio in the case of air supply and consumption) is 50-60%.

In the above power generator system, the temperature of the reformer 1, amounts of water and methanol supplied, temperature of the stack 10 and the amount of air supplied are controlled by a central controller 18 in the form of a microprocessor or the like. On the other hand, the output voltage from the stack 10 is controlled by an output controller 17 in the form of a microprocessor or the like under the control of the central controller 18 and is applied to a back-up battery 19. Reference numeral 20 denotes a load to which power is supplied from the battery 19.

The control of the utilization ratios for hydrogen and oxygen is carried out by setting the output current from the stack 10 and by supplying water and methanol as a reforming material to the reformer 1 in proportion to the set current.

In FIG. 2, reference numeral 21 denotes a current detector for detecting the output current from the fuel cell stack 10, such as an ammeter, from which the detected current is supplied to the central controller 18. Further, reference numerals 101 through 108 denote signal lines for exchanging control signals.

In order that the amount of the reformed gas supplied to the fuel cell stack 10 is controlled to follow the output current Is from the fuel cell stack 10, the central controller 18 compares a predetermined current value $I_0$ with the stack output current value Is detected by the current detector 21 and controls the pumps 3 and 5 and the fans 7 and 15 in accordance with the difference between both values to control the amount of reforming material to be supplied.

When the output is derived from the fuel cell stack 10, the output voltage is controlled to exhibit a predetermined voltage value decreasing stepwise from a high voltage toward a low voltage. This voltage value is selected so as to avoid a region where the voltage changes rapidly as shown in the I-V curve in FIG. 1. Therefore, as seen from the I-V curve, the voltage is set at a high value in a region where the stack output current Is is low, while the voltage is set at a low value in a region where the stack output current Is is high. After the setting of the voltage value, the output current Is is detected by the current detector 21, so that the current is outputted at a voltage value corresponding to the detected current value. Then, the amount of the reforming material to be charged is so controlled as to decrease the output of the reformer 1 when the output current value Is is higher than the predetermined current value $I_0$, or to increase the output of the reformer 1 when Is is lower than $I_0$.

The output voltage from the fuel cell stack 10 is controlled to change stepwise from a high voltage to a low voltage, while maintaining the predetermined voltage value, by the output controller 17 controlled by the central controller 18. Further, the current detector 21, the central controller 18 and the output controller 17 form a closed loop, so that the output current Is from the fuel cell stack 10 detected by the current detector 21 is fed back to the central controller 18 to control the output controller 17.

Figure 3:
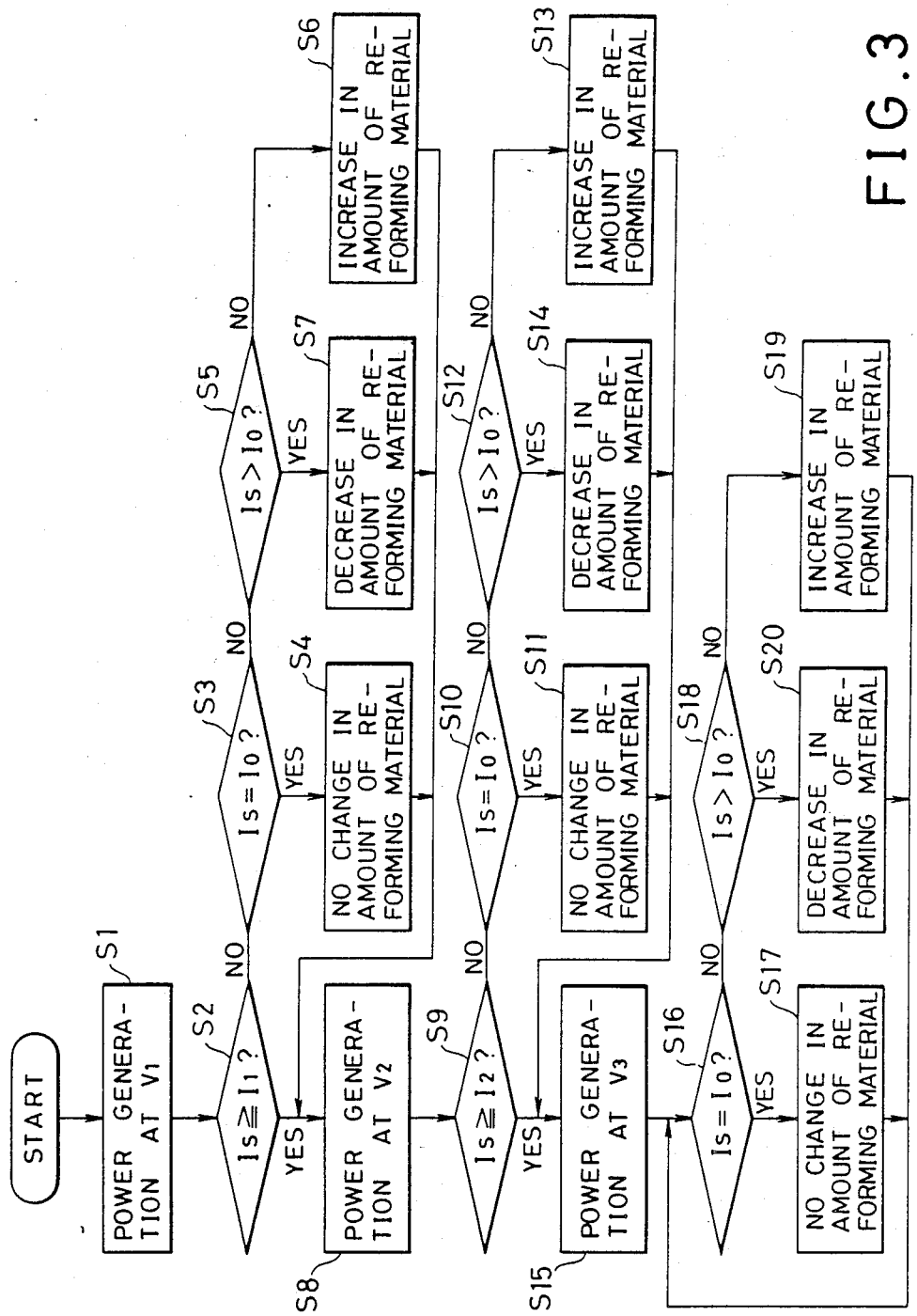
FIG. 3 is a flow chart illustrating an example of a control procedure according to the present invention.

FIG. 3 is a flow chart showing an example of a control procedure in the first embodiment of the present invention. This control procedure is stored in a ROM in the central controller 18. The case where the output voltage from the fuel cell is set at a predetermined value by changing the output voltage through three stages of the set voltages will be described with reference to the I-V curves illustrated in FIG. 1.

At first, electricity of the fuel cell is generated at an output voltage $V_1$ in step S1. Then, in Step S2, it is judged whether or not the output current Is from the fuel cell stack 10 is larger than the current $I_1$. If Is≧$I_1$, then the procedure proceeds to step S8, whereas if Is<$I_1$, then the procedure proceeds to step S3.

In step S3, it is judged whether or not the stack output current Is is equal to the predetermined current $I_0$. If Is=$I_0$, the procedure proceeds to step S4 where the reforming material is neither increased nor decreased. If Is≠$I_0$, the procedure proceeds to step S5. In step S5, it is judged whether or not Is is larger than $I_0$. If Is<$I_0$, the procedure proceeds to step S6 to increase the amount of the reforming material to be supplied to the reformer 1. If Is>$I_0$, the procedure proceeds to step S7 to decrease the amount of the reforming material to be supplied to the reformer 1. The output current Is is increased or decreased in accordance with the increase or decrease of the reforming material. After the completion of step S4, S6 or S7, the procedure proceeds to step S8.

In step S8, power generation is controlled by reducing the output voltage from $V_1$ to $V_2$ by the output controller 17. The procedure proceeds to step S9 when power generation is being performed while maintaining the output voltage at $V_2$. In step S9, it is judged whether or not the output current Is from the fuel cell stack 10 is larger than the current $I_2$. If Is≧$I_2$, the procedure proceeds to step S15. If Is<$I_2$, the procedure proceeds to step S10.

In step S10, it is judged whether or not the output current Is from the fuel cell stack 10 is equal to the predetermined current $I_0$. If Is=$I_0$, the procedure proceeds to step S11 where the reforming material is neither increased nor decreased. If Is≠$I_0$, the procedure proceeds to step S12. In step S12, it is judged whether or not Is is larger than $I_0$. If Is<$I_0$, the procedure proceeds to step S13 to increase the amount of the reforming material to be supplied. If Is>$I_0$, the procedure proceeds to step S14 to decrease the amount of the reforming material to be supplied. After the completion of step S11, S13 or S14, the procedure proceeds to step S15.

In step S15, power generation is controlled by reducing the voltage from $V_2$ to $V_3$. The procedure proceeds to step S16 when power generation is being performed while maintaining the output voltage at $V_3$. In step S16, it is judged whether or not the output current Is from the fuel cell stack 10 is equal to the predetermined current $I_0$. If Is=$I_0$, the procedure proceeds to step S17 where the reforming material is not increased nor decreased. If Is≠$I_0$, the procedure proceeds to step S18. In step S18, it is judged whether or not Is is larger than $I_0$. If Is<$I_0$, the procedure proceeds to step S19 to increase the amount of the reforming material to be supplied. On the other hand, if Is>$I_0$, the procedure proceeds to step S20 to decrease the amount of the reforming material to be supplied. After the completion of step S17, S19 or S20, the procedure returns to step S16.

In accordance with the above-described control procedure, the output voltage of the fuel cell stack 10 is stepwise set, so that the amount of the reforming material to be supplied is controlled by following the difference between the predetermined current and the output current from the fuel cell stack 10 at each stage. In this control method, the output current from the fuel cell is outputted, while maintaining the output voltage thereof at a constant value, instead of maintaining the output current at a constant value, so that the output power from the stack 10 is not lowered.

The number of stages in the case of setting the output voltage at the predetermined voltage value may optionally be selected as mentioned above, but the control procedure becomes complicated as the number of the stages becomes large.

The predetermined value $I_0$ with respect to the output current from the fuel cell stack 10 is determined in accordance with power consumption by the load 20. However, as mentioned above, it takes a long period of time until the reformed gas is produced by the reforming reaction after the reforming material is supplied to the reformer 1 and then is fed to the stack 10, so that the output power can not immediately be raised in response to the requirement from the load 20. In view of this, the following method can be employed. That is, the battery 19 for back-up at a peak output is connected in parallel to the output side of the stack 10, and the charged condition of the battery 19 is detected. Then, the set current value $I_0$ of the stack 10 is made larger when the charge amount is large, and the value $I_0$ is made smaller when the charge amount is small.

While in the above-mentioned embodiment, the output voltage of the stack 10 is stepwise rendered into a constant value, it is clear that a single voltage may be initially set. For example, the output voltage is initially set at the voltage $V_3$ in FIG. 1, and the output of the reformer 1 or the amount of the reforming material supplied to the reformer 1 is controlled in accordance with the comparison between the output current Is and the set current $I_0$. This control is the same as that shown in steps S15–S20 in FIG. 3.

Further, the output from the fuel cell stack 10 is largely influenced by the composition of the fuel supplied and a like. For instance, there is the decrease in the amount of hydrogen to be supplied due to the decrease in the reformation ratio caused by the degradation of the reformation catalyst. Furthermore, when methanol is used as a reforming material, CO is also produced together with $H_2$ and $CO_2$. If they return to the reformer 1 without being consumed in the fuel cell 10, the amount of CO content which might damage the catalyst is increased. In the embodiment of the present invention, however, power generation is controlled in such a way that the power generation is balanced only with respect to the amount of hydrogen supplied to the fuel cell stack 10, so that a gas shortage is not caused in the fuel cell stack 10.

While in the embodiment of the present invention, the output current is controlled by controlling the amount of the reforming material to be supplied or the amount of the fuel to be supplied to the stack 10, the output current can be controlled by controlling the amount of air to be supplied to the stack 10 or the amount of oxygen to be supplied as an oxidizing agent. In the latter method, when the output current Is is, for example, larger than the set current $I_0$, the amount of air to be supplied to the stack 10 is controlled to be increased.

Figure 4:
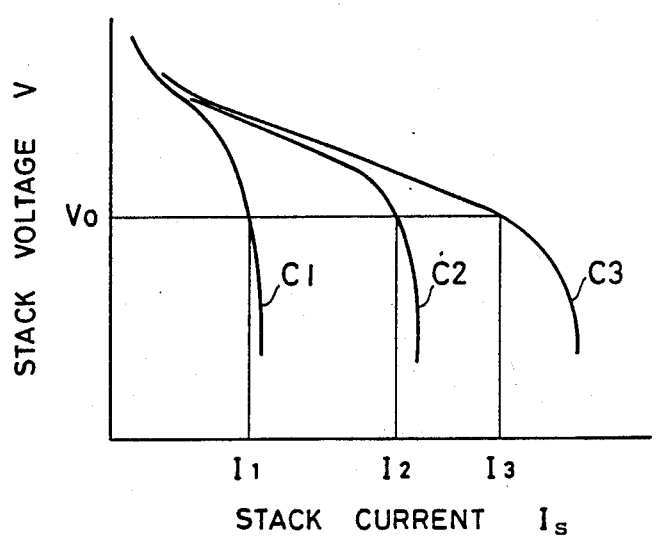
FIG. 4 is a graph illustrating the relationship between the output current and the output voltage of the fuel cell stack in the second embodiment of the present invention.

FIG. 4 shows the relationship between the output current I and the voltage V of the fuel cell stack (or unit cell). In FIG. 4, Cl, C2 and C3 indicate I-V curves (current-voltage curves) when the amount of fuel (reformed gas) supplied to the stack 10 is varied at a predetermined temperature, respectively. The amount of fuel becomes larger in the sequence of the I-V curves Cl, C2 and C3, and in this case the curves C1, C2 and C3 show currents $I_1$, $I_2$ and $I_3$ at the voltage $V_0$, respectively. That is, the larger the fuel amount, the larger the current generated at the same voltage.

Here, the power generation is carried out while maintaining the voltage of the stack 10 at a constant voltage. By comparing the output current Is of the stack 10 detected during the generation with the predetermined current $I_0$, the fuel cell can be controlled. That is, if $Is > I_0$, the output from the reformer 1 (amount of reformed gas) is decreased, whereas if $Is < I_0$, the output from the reformer 1 is increased. In this method, the stack 10 generates only the current determined in accordance with the current-voltage characteristic of the stack 10 defined by the amount of the reformed gas supplied, so that there is no fear that the response in the reformer 1 is delayed or the hydrogen gas supply becomes short.

In order to efficiently generate power by increasing the utilization ratio of fuel in the stack 10 to a value which is as high as possible, when the fuel cell is controlled by the above-mentioned method, it is desirable that the power generation is performed in the region dominated by diffusion polarization or the curved portion rapidly lowering the voltage value in the I-V curve rather than in the region dominated by resistance polarization or the straight line portion of the I-V curve.

However, when the fuel cell is run in a condition where the voltage of the stack exists in the region strongly dominated by diffusion polarization, there occurs a problem that the life of the stack is shortened.

According to the present invention, therefore, at least one of unit cells constituting the fuel cell stack is used as a monitoring cell having a current-voltage characteristic lower than that of the remaining unit cells, and the power generation of the fuel cell stack is carried out while keeping the voltage of the monitoring cell constant. The value of the output current from the fuel cell stack is detected and is compared with the predetermined current to obtain the difference therebetween. Then, the amount of the fuel and/or the oxidizing agent supplied to the fuel cell is varied in accordance with the above-mentioned difference of the current value to control the fuel cell.

FIG. 2 shows an embodiment of the power generator system utilizing the fuel cell which is operated in accordance with the control method according to the present invention.

In order to control the amount of the reformed gas supplied to the fuel cell stack 10 in such a way that the amount follows the output current Is from the fuel cell stack 10, the central controller 18 compares the predetermined current value $I_0$ with the output current value Is from the stack 10 detected by the current detector 21 to control the pumps 3 and 5 and the fans 7 and 15 in accordance with the difference between both current values, so that the amounts of the reforming materials supplied to the reformer 1 is controlled.

Figure 5:
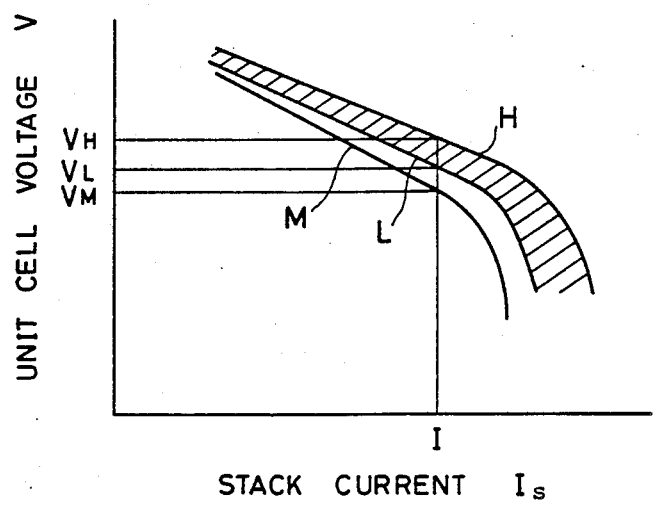
FIG. 5 is a graph illustrating the relationship between the output current of the fuel cell stack and the output voltage of the unit cell according to the present invention.

FIG. 5 illustrates the relationship between the output current I from the fuel cell stack 10 and the output voltage V of its unit cell. When one of the unit cells constituting the stack 10 is used as the monitoring cell, the I-V curves of the remaining unit cells reside within a range between the curves H and L shown in FIG. 5 when the flow rate is within the range of the flow rate of the reforming fuel and the quality of the remaining unit cells is so controlled that the I-V curves of the remaining unit cells are higher than the I-V curve M of the monitoring cell.

In the monitoring cell, the area of the fuel electrode is 90–95% of that of each of the remaining unit cells, so that the output per unit area is increased. Alternatively, the head loss between the input port and the output port of the fuel cell 105–110% of that of the other unit cells, whereby the amount of the reformed gas supplied is 90–95% of that of the other unit cells, even though the electrode area of the monitoring cell is the same as that of the other unit cells. Thus, power generation by the monitoring cell is carried out under conditions worse than those of the other unit cell to locate the I-V curve M of the monitoring cells at a position that the characteristic of the curve M is lower than that of the I-V curve L.

At least one monitoring cell having the above-described I-V characteristic is incorporated into the stack 10. Then, the reformed gas is supplied to the stack 10 to conduct the power generation while maintaining the voltage of the monitoring cell at a constant voltage $V_M$. Consequently, the voltages of the remaining unit cells fall in a range between $V_L$ and $V_H$, which is higher than the constant voltage $V_M$. The power generation by the fuel cell stack 10 is carried out by setting the voltage of the monitoring cell at $V_M$, and then an output current Is from the stack 10 is detected by the current detector 21. The amount of the reforming material to be supplied is controlled as follows. That is, if the detected output current value Is is larger than the predetermined current value $I_0$, the output of the reformer 1 is suppressed.

On the other hand, if Is is smaller than $I_0$, the output of the reformer 1 is raised.

The output voltage of the monitoring cell is controlled so as to keep the voltage value $V_M$ by the controller 17 controlled by the central controller 18. Here, the current detector 21, the central controller 18 and the output controller 17 form a closed loop, so that the output current Is from the fuel cell stack 10 detected by the current detector 21 is fed back to the central controller 18 to control the output controller 17.

Figure 6:
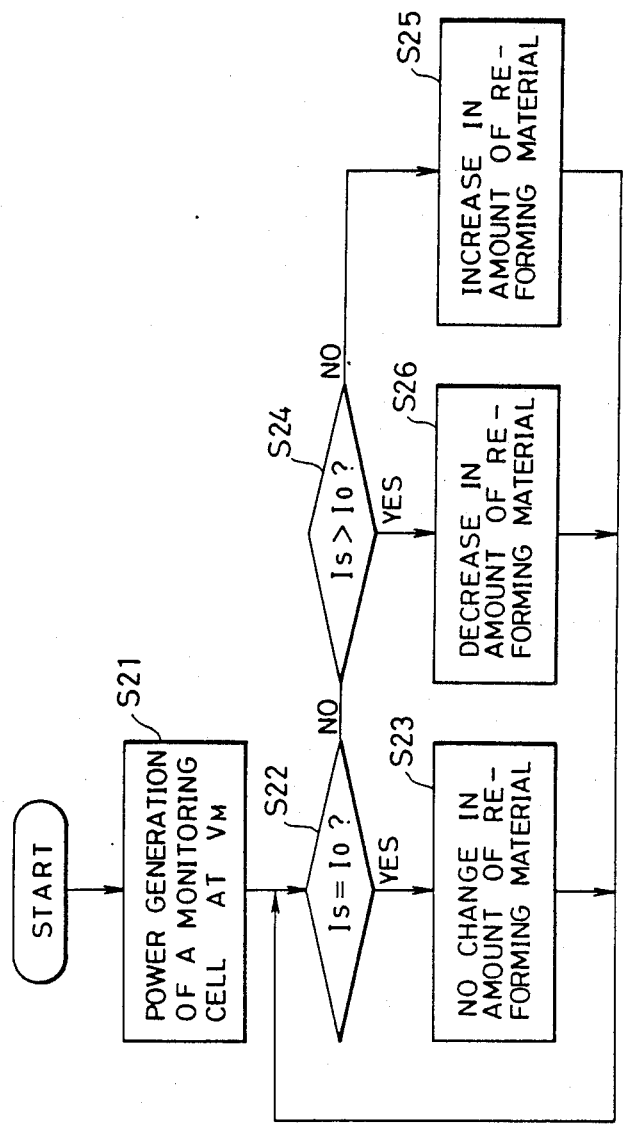
FIG. 6 is a flow chart illustrating another example of a control procedure according to the present invention.

FIG. 6 is a flow chart showing an example of a control procedure in the embodiment of the present invention. This control procedure is previously stored in the ROM in the central controller 18.

At first, electricity of the monitoring cell is generated at an output voltage $V_M$ in step S21. Then, the procedure proceeds to step S22, where it is judged whether or not the output current Is from the fuel cell stack 10 is equal to the predetermined current $I_0$. If $Is = I_0$, the procedure proceeds to step S23 where the reforming material is neither increased nor decreased. If $Is \neq I_0$, the procedure proceeds to step S24, where it is judged whether or not Is is larger than $I_0$. If $Is < I_0$, the procedure proceeds to step S25 to increase the amount of the reforming material supplied. While, if $Is > I_0$, the procedure proceeds to step S26 to decrease the amount of the reforming material to be supplied. After the completion of step S23, S25 or S26, the procedure returns to step S22.

In accordance with the above-described control procedure, the amount of the reforming material to be supplied is controlled by following the difference between the predetermined current and the output current from the fuel cell stack 10. In this control method, the output voltage from the fuel cell is made constant instead of the output current, so that the output of the stack 10 does not decrease. Furthermore, the power generation by the monitoring cell is carried out under the worst conditions and the output current Is which is determined by the voltage $V_M$ of the monitoring cell is generated, so that the remaining unit cells are not damaged.

Although the above-described embodiment has been explained with reference to the case where only one monitoring cell is incorporated into the fuel cell stack 10, a plurality of monitoring cells may be used. In the latter case, these monitoring cells are dispersed within the stack 10.

The incorporation of a plurality of monitoring cells is effective when a large output power is derived from the stack. That is, the number of monitoring cells increases in the stack having a large output power, so that the reformed gas would not be uniformly supplied to all of the monitoring cells and the supply has some distribution. If the number of monitoring cells is only one, there is a fear that a unit cell remote from the position of the monitoring cell generates electric power under the supply condition of the reformed gas worse than that in the case of the monitoring cell due to the distribution of the reformed gas.

In view of this, a plurality of monitoring cells can be a dispersed manner within arranged in the stack and the voltages of these cells are monitored. Among these cells, attention is given to the monitoring cell showing the lowest voltage and then the power generation is carried out by keeping the voltage at a constant value, whereby the power generator system can be operated by controlling the amount of the reforming material to be supplied in the same manner as in the case of one monitoring cell.

Further, the output from the fuel cell stack 10 is largely influenced by the composition of the fuel supplied and the like. For instance, there is a decrease in the amount of hydrogen to be supplied due to the decrease in the reformation ratio caused by the degradation of the reformation catalyst. Furthermore, when methanol is used as a reforming material, CO is also produced together with $H_2$ and $CO_2$. If they return to the reformer 1 without being consumed in the fuel cell 10, the amount of CO content damaging the catalyst is increased. In the embodiment of the present invention, however, power generation is controlled in such a way that the power generation is balanced only to the amount of hydrogen supplied to the fuel cell stack 10, so that the gas shortage is not caused in the fuel cell stack 10.

While in the embodiment of the present invention, the output current is controlled by controlling the amount of the reforming material to be supplied or the amount of the fuel to be supplied to the stack 10, the output current can be controlled by controlling the amount of air to be supplied to the stack 10 or the amount of oxygen to be supplied as an oxidizing agent. In the latter method, when the output current Is is, for example, larger than the set current $I_0$, the amount of air to be supplied to the stack 10 is controlled so as to be increased.

As mentioned above, according to the present invention, the power generation is carried out by controlling the supply of the fuel and/or the oxidizing agent in accordance with the difference between the predetermined current and the output current, while maintaining the output voltage of a stack at the constant voltage. Alternatively, according to the present invention, the power generation is carried out by controlling the supply of the fuel and/or the oxidizing agent in accordance with the difference between the predetermined current and the output current, while maintaining the voltage of the monitoring cell at a constant voltage.

In any case, therefore, it is not required to use an excessive amount of fuel, and energy is effectively utilized. In addition, there is no fear that an excessive amount of fuel is returned to the reformer to overheat the catalyst, so that the life of the catalyst is extended further and the efficiency of the power generation is enhanced.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A method for controlling a fuel cell having a fuel cell stack to which a reformed fuel and an oxidizing agent are supplied, said method comprising the steps of:
    generating electric power while keeping said fuel cell stack at a voltage having a constant value;
    detecting an output current $I_s$ from said fuel cell stack, said output current $I_s$ being proportional to consumed amounts of said reformed fuel and said oxidizing agent;

calculating the difference between the value of said output current $I_s$ detected and a predetermined current value $I_o$; and varying the amount of said fuel and/or oxidizing agent to be supplied in accordance with said difference so as to minimize said difference by reducing the amount supplied when $I_s > I_o$ and increasing the amount supplied when $I_s < I_o$, whereby electric power is generated in a stable manner.

2. The method claimed in claim 1, wherein the value of said predetermined current is set in a stepwise manner.

3. The method claimed in claim 2, wherein the value of said predetermined current is set in accordance with the power consumption of a load connected to said fuel cell.

4. The method claimed in claim 2, wherein the value of said predetermined current is set in accordance with the amount of charge in a back-up battery connected in parallel with said fuel cell.

5. The method claimed in claim 1, wherein said fuel is hydrogen and said oxidizing agent is air.

6. A method for controlling a fuel cell having a fuel cell stack comprised of a plurality of unit cells to which a reformed fuel and an oxidizing agent are supplied, said method comprising the steps of:

using at least one of said plurality of unit cells constituting said fuel cell stack as a monitoring cell, said monitoring cell, for a given output current Is through said stack, having a voltage thereacross which is less than the voltage across said remaining unit cells for said given output current;

generating electric power while keeping said monitoring cell at a voltage having a constant value;

detecting said output current from said fuel cell stack, said output current being proportional to consumed amounts of said reformed fuel and said oxidizing agent;

calculating the difference between the value of said output current $I_s$ and a predetermined current value $I_o$; and varying the amount of said fuel and/or oxidizing agent to be supplied in accordance with said difference so as to minimize said difference by reducing the amount supplied when $I_s > I_o$ and increasing the amount supplied when $I_s < I_o$, whereby electric power is generated in a stable manner.

7. The method claimed in claim 6, wherein the value of said predetermined current is set in a stepwise manner.

8. The method claimed in claim 7, wherein the value of said predetermined current is set in accordance with the power consumption of a load connected to said fuel cell.

9. The method claimed in claim 8, wherein the value of said predetermined current is set in accordance with the amount of charge in a back-up battery connected in parallel with said fuel cell.

10. The method claimed in claim 6, wherein said fuel is hydrogen and said oxidizing agent is air.

* * * * *